(12) United States Patent
Ishima et al.

(10) Patent No.: US 10,517,289 B2
(45) Date of Patent: Dec. 31, 2019

(54) INSECT-PROOFING FILM AND INSECT-PROOFING COVER

(71) Applicant: ADEKA CORPORATION, Tokyo (JP)

(72) Inventors: Yosuke Ishima, Saitama (JP); Kohei Omori, Saitama (JP); Taro Sampei, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 199 days.

(21) Appl. No.: 15/550,911

(22) PCT Filed: Mar. 4, 2016

(86) PCT No.: PCT/JP2016/056811
§ 371 (c)(1),
(2) Date: Aug. 14, 2017

(87) PCT Pub. No.: WO2016/147911
PCT Pub. Date: Sep. 22, 2016

(65) Prior Publication Data
US 2018/0042217 A1    Feb. 15, 2018

(30) Foreign Application Priority Data

Mar. 17, 2015 (JP) ................................. 2015-053489

(51) Int. Cl.
*A61K 31/53* (2006.01)
*A01M 29/08* (2011.01)
*C08K 5/3492* (2006.01)

(52) U.S. Cl.
CPC ........... *A01M 29/08* (2013.01); *C08K 5/3492* (2013.01)

(58) Field of Classification Search
CPC ............................. A61K 31/53; C07D 251/24
USPC ......................... 514/291; 544/215
See application file for complete search history.

(56) References Cited

U.S. PATENT DOCUMENTS 7,553,892 B2 * 6/2009 Negishi ............... C08K 5/3492
                                                            523/122
2015/0329684 A1 11/2015 Kamimoto et al.

FOREIGN PATENT DOCUMENTS

| CN | 1836898 A | 9/2006 | |
|---|---|---|---|
| JP | 55-23921 | 2/1980 | |
| JP | H11-71356 A | 3/1999 | |
| JP | 2000-169767 | 6/2000 | |
| JP | 2003-016824 | 1/2003 | |
| JP | WO2005/109052 | * 11/2005 | .............. G02B 5/30 |
| JP | 2007-254532 | 10/2007 | |
| JP | 2011-068618 A | 4/2011 | |
| JP | 2013-067811 | 4/2013 | |
| WO | 2014-088057 | 6/2014 | |

OTHER PUBLICATIONS

International Search Report, PCT/JP2016/056811, dated May 10, 2016.
Extended European Search Report for Application No. 16764741.1, dated Oct. 29, 2018.

* cited by examiner

*Primary Examiner* — Jeffrey H Murray
(74) *Attorney, Agent, or Firm* — Young & Thompson

(57) ABSTRACT

Disclosed is an insect-proofing film and an insect-proofing cover capable of preventing flying insects from being attracted to or flying toward light-emitting elements, indoor space, and crops, and more specifically, provides an insect-proofing film and an insect-proofing cover wherein the insect-proofing film/insect-proofing cover includes at least one type of triazine-based compound represented by formula (1). (In formula (1), $R^1$ to $R^3$ each represent a $C_{1-12}$ linear or branched alkyl group, etc.; and $R^4$ to $R^6$ each represent a $C_{1-8}$ alkyl group, a $C_{2-8}$ alkenyl group, etc.)

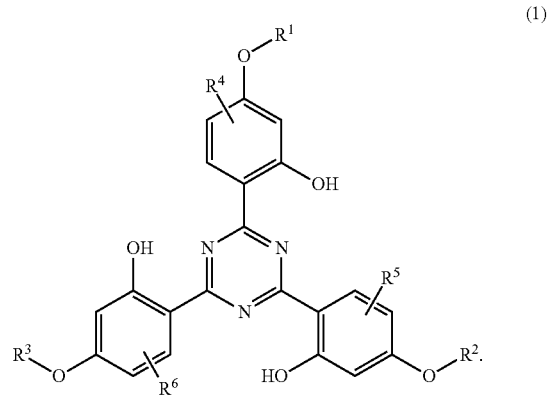

2 Claims, No Drawings

INSECT-PROOFING FILM AND INSECT-PROOFING COVER

TECHNICAL FIELD

The present invention relates to an insect-proofing film and an insect-proofing cover usable, for example, for light-emitting elements and window panes and for agricultural purposes in order to ward off flying insects.

BACKGROUND ART

Phototactic flying insects are not only unsightly and unpleasant, but cause problems in various industries. For example, incidents where products made in food factories are contaminated by flying insects, such as flies and mosquitoes, are major issues in terms of quality control for hygienic reasons. At suburban factories, agricultural pests, such as planthoppers (Delphacidae) and leafhoppers (Cicadellidae), may get trapped in products as a result of such pests being attracted by lamplight from surrounding paddies and fields and flying toward the factories. Flying insects may also fly toward suburban restaurants and all-night convenience stores and greatly impact the business thereof by giving customers an unpleasant impression. Flying insects are also problematic in medical facilities, such as hospitals, and homes/residences, and are not preferable for hygienic and aesthetic reasons. Further, countermeasures against pests such as flying insects are an important task in the cultivation of crops.

Flying insects have a positive phototaxis and respond strongly to UV rays, and are strongly attracted particularly to UV rays in the long-wavelength range from 340 nm to 400 nm. Thus, flying insects are attracted to light-emitting elements emitting UV rays in the long-wavelength range, such as fluorescent lamps, mercury lamps, and LED illumination.

As countermeasures against these flying insects, various insect-proofing films and insect-proofing covers have been proposed which block UV rays by including a UV absorber. Such insect-proofing films and insect-proofing covers are used by being bonded to light-emitting elements, such as fluorescent lamps, mercury lamps, and LED illumination, or by covering such light-emitting elements, or by being bonded to window panes, or being employed as agricultural films, with the aim of blocking UV rays attracting flying insects (Patent Literatures 1 and 2).

Such conventional insect-proofing films and insect-proofing covers, however, have an insufficient capability of blocking UV rays in the long-wavelength range from 340 nm to 400 nm, and have an insufficient effect of inhibiting the attraction of flying insects. Further, such films/covers also block rays in the visible range (from 450 nm to 500 nm), thus reducing the amount of visible rays of light and making the lighting dim and/or the color of the lighting unnatural; if such films/covers are bonded to window panes, transparency may be impaired and/or the intake of natural light may be hindered. In agricultural applications, it is necessary to take in natural light to cultivate crops successfully while blocking UV rays to prevent the attraction of flying pests. Thus, there has been a demand for improvement in these areas.

CITATION LIST

Patent Literature

Patent Literature 1: JP 2003-16824A
Patent Literature 2: JP 2000-169767A

SUMMARY OF INVENTION

Technical Problem

An objective of the present invention is to provide an insect-proofing film and an insect-proofing cover capable of preventing flying insects from being attracted to or flying toward light-emitting elements, indoor space, and crops.

Solution to Problem

As a result of diligent research to solve the problems, Inventors have found the use of a triazine-based UV absorber having a specific structure, thus arriving at the present invention.

The present invention provides an insect-proofing film or insect-proofing cover including, as a UV absorber, at least one type of triazine-based compound represented by the formula (1):

[Chem. 1]

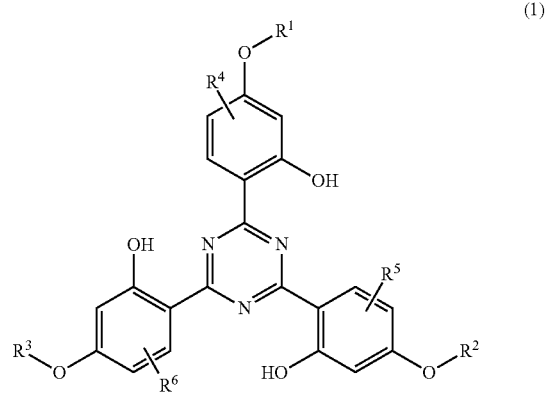

(in the formula (1), $R^1$ to $R^3$ may be the same or different from one another and each represent a $C_{1-12}$ linear or branched alkyl group, a $C_{3-8}$ cycloalkyl group, a $C_{2-8}$ alkenyl group, a $C_{6-18}$ aryl group, a $C_{7-18}$ alkylaryl group, or a $C_{7-18}$ arylalkyl group, wherein the alkyl group, the cycloalkyl group, the alkenyl group, the aryl group, the alkylaryl group, or the arylalkyl group may be optionally substituted by a hydroxy group, a halogen atom, or a $C_{1-12}$ alkyl group or alkoxy group, or may be optionally interrupted by an oxygen atom, a sulfur atom, a carbonyl group, an ester group, an amide group, or an imino group, and the substitution and the interruption may be employed in combination; and $R^4$ to $R^6$ may be the same or different from one another and each represent a $C_{1-8}$ alkyl group or a $C_{2-8}$ alkenyl group).

The present invention further provides insect-proofing film or insect-proofing cover, wherein the triazine-based compound represented by the formula (1) is a triazine-based compound represented by the formula (2):

[Chem. 2]

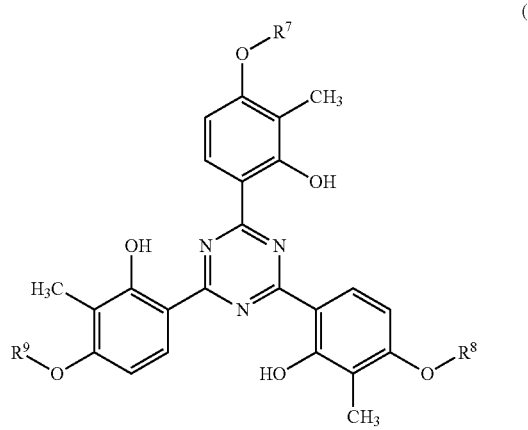

(2)

(in the formula (2), $R^7$ to $R^9$ may be the same or different from one another and each represent a $C_{1-12}$ linear or branched alkyl group, wherein the alkyl group may be optionally substituted by a hydroxy group, a halogen atom, or a $C_{1-12}$ alkoxy group, or may be optionally interrupted by an oxygen atom, a sulfur atom, a carbonyl group, an ester group, an amide group, or an imino group).

The present invention further provides an insect-proofing film or insect-proofing cover, wherein the transmittance of visible rays at a wavelength of 500 nm is from 80 to 100%, and the transmittance of UV rays at a wavelength of 400 nm is from 0 to 5.0%.

Advantageous Effects of Invention

The present invention can provide an insect-proofing film that, by being used for light-emitting elements, window panes, crop cultivation, etc., is capable of efficiently blocking UV rays to which flying insects respond, particularly UV rays in the long-wavelength range from 340 nm to 400 nm, and thus preventing flying insects from being attracted or flying in. The present invention can also provide an insect-proofing cover that, by covering a light-emitting element, is capable of efficiently blocking UV rays to which flying insects respond, particularly UV rays in the long-wavelength range from 340 nm to 400 nm, and thus preventing flying insects from being attracted or flying in. The present invention can also provide an insect-proofing film and an insect-proofing cover capable of preventing flying insects from being attracted or flying in and also having excellent transmittance of visible rays.

DESCRIPTION OF EMBODIMENTS

The insect-proofing film and insect-proofing cover of the present invention are described in detail below according to preferred embodiments thereof.

The present invention relates to an insect-proofing film or an insect-proofing cover. In the present invention, an "insect-proofing film" refers to an article that has the function to prevent the attraction and/or flying-in of flying insects and that has a form in which the thickness is less than 200 μm, whereas an "insect-proofing cover" refers to an article that has the function to prevent the attraction and/or flying-in of flying insects and that has a form in which the thickness is 200 μm or greater.

The insect-proofing film and insect-proofing cover of the present invention include, as a UV absorber, at least one type of triazine-based compound represented by the formula (1):

[Chem. 3]

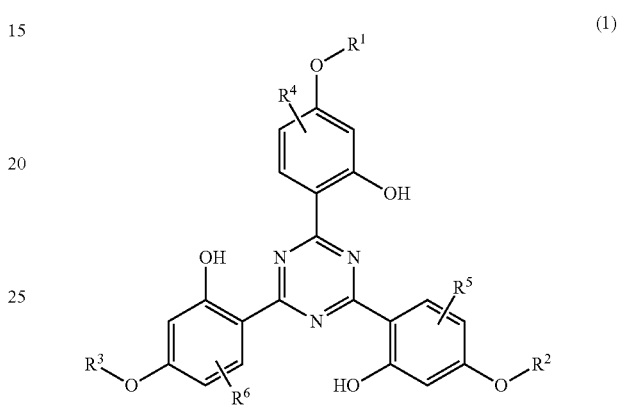

(1)

(in the formula (1), $R^1$ to $R^3$ may be the same or different from one another and each represent a $C_{1-12}$ linear or branched alkyl group, a $C_{3-8}$ cycloalkyl group, a $C_{2-8}$ alkenyl group, a $C_{6-18}$ aryl group, a $C_{7-18}$ alkylaryl group, or a $C_{7-18}$ arylalkyl group, wherein the alkyl group, the cycloalkyl group, the alkenyl group, the aryl group, the alkylaryl group, or the arylalkyl group may be optionally substituted by a hydroxy group, a halogen atom, or a $C_{1-12}$ alkyl group or alkoxy group, or may be optionally interrupted by an oxygen atom, a sulfur atom, a carbonyl group, an ester group, an amide group, or an imino group, and the substitution and the interruption may be employed in combination; and $R^4$ to $R^6$ may be the same or different from one another and each represent a $C_{1-8}$ alkyl group or a $C_{2-8}$ alkenyl group).

In the formula (1), examples of the $C_{1-12}$ linear or branched alkyl group represented by $R^1$ to $R^3$ include linear or branched alkyl groups, such as methyl, ethyl, propyl, isopropyl, butyl, isobutyl, sec-butyl, tert-butyl, amyl, tert-amyl, hexyl, octyl, sec-octyl, tert-octyl, 2-ethylhexyl, decyl, undecyl, and dodecyl.

Examples of the $C_{3-8}$ cycloalkyl group include cyclopropyl, cyclopentyl, cyclohexyl, cycloheptyl, and cyclooctyl groups.

Examples of the $C_{2-8}$ alkenyl group include linear and branched propenyl, butenyl, pentenyl, hexenyl, heptenyl, and octenyl groups, regardless of the position of the unsaturated bond.

Examples of the $C_{6-18}$ aryl group include phenyl, naphthyl, and biphenyl groups.

Examples of the $C_{7-18}$ alkylaryl group include methylphenyl, dimethylphenyl, ethylphenyl, and octylphenyl groups.

Examples of the $C_{7-18}$ arylalkyl group include benzyl, 2-phenylethyl, and 1-methyl-1-phenylethyl groups.

The alkyl group, cycloalkyl group, alkenyl group, aryl group, alkylaryl group, or arylalkyl group may be optionally substituted by a hydroxy group, a halogen atom, or a $C_{1-12}$ alkyl group or alkoxy group, and/or may be optionally interrupted by an oxygen atom, a sulfur atom, a carbonyl group, an ester group, an amide group, or an imido group. The substitution and interruption may be employed in combination.

The expression "the alkyl group, the cycloalkyl group, the alkenyl group, the aryl group, the alkylaryl group, or the arylalkyl group may be optionally interrupted by an oxygen atom, a sulfur atom, a carbonyl group, an ester group, an amide group, or imino group" means that —$CH_2$— or —CH= in the alkyl group, cycloalkyl group, alkenyl group, aryl group, alkylaryl group, or arylalkyl group may be substituted by an oxygen atom, a sulfur atom, a carbonyl group, an ester group, an amide group, or an imido group.

The substitution and interruption may be employed in combination, but interruption by two or more of the same groups in succession does not occur; for example, a group will not include —O—O—, interrupted by two consecutive oxygen atoms.

Examples of the $C_{1-12}$ alkyl groups include the same groups as the linear or branched alkyl groups represented by $R^1$ to $R^3$ in the formula (1). Examples of the $C_{1-12}$ alkoxy group include methoxy, ethoxy, propoxy, butoxy, pentoxy, hexaoxy, octoxy, nonyloxy, decyloxy, undecyloxy, and dodecyloxy groups.

The ester group is a group formed by dehydration condensation of a carboxylic acid and an alcohol. The amide group is a group formed by dehydration condensation of a carboxylic acid and an amine.

Examples of alkyl groups or cycloalkyl groups including the substituent or interruption include 2-hydroxypropyl, 2-methoxyethyl, 3-sulfonyl-2-hydroxypropyl, and 4-methylcyclohexyl groups.

Examples of aryl groups including the substituent or interruption include 4-methylphenyl, 3-chlorophenyl, 4-benzyloxyphenyl, 4-cyanophenyl, 4-phenoxyphenyl, 4-glycidyloxyphenyl, and 4-isocyanuratephenyl groups.

Preferred among the groups represented by $R^1$ to $R^3$ are the $C_{1-12}$ linear or branched alkyl groups, and particularly the hexyl group, because of excellent absorption of long-wavelength range UV rays.

Examples of the $C_{1-8}$ alkyl groups represented by $R^4$ to $R^6$ include methyl, ethyl, propyl, isopropyl, butyl, sec-butyl, tert-butyl, isobutyl, amyl, tert-amyl, hexyl, octyl, and tort-octyl groups.

Examples of the $C_{2-8}$ alkenyl groups include the $C_{2-8}$ alkenyl groups represented by $R^1$ to $R^3$ in the formula (1).

Preferred among $R^4$ to $R^6$ are the $C_{1-8}$ alkyl groups, and particularly the methyl group, because of excellent absorption of long-wavelength range UV rays.

Preferred among the triazine-based compound represented by the formula (1) is a compound represented by the formula (2):

[Chem. 4]

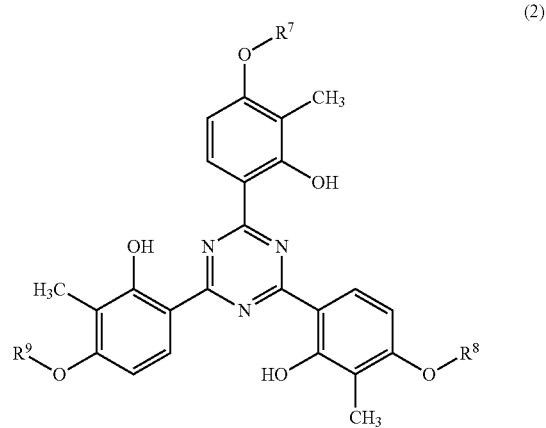

(2)

(in the formula (2), $R^7$ to $R^9$ may be the same or different from one another and each represent a $C_{1-12}$ linear or branched alkyl group, wherein the alkyl group may be optionally substituted by a hydroxy group, a halogen atom, or a $C_{1-12}$ alkoxy group, or may be optionally interrupted by an oxygen atom, a sulfur atom, a carbonyl group, an ester group, an amide group, or an imino group).

Examples of the $C_{1-12}$ linear or branched alkyl groups represented by $R^7$ to $R^9$ in the formula (2) include the same groups as the linear or branched alkyl groups represented by $R^1$ to $R^3$ in the formula (1).

Examples of the $C_{1-12}$ alkoxy group that may substitute the alkyl group include the same groups as the $C_{1-12}$ alkoxy groups that may substitute the alkyl group, etc., represented by $R^1$ to $R^3$ in the formula (1).

Examples of the triazine-based compounds represented by the formula (1) or (2) of the present invention include the following compounds Nos. 1 to 5.

[Chem. 5]

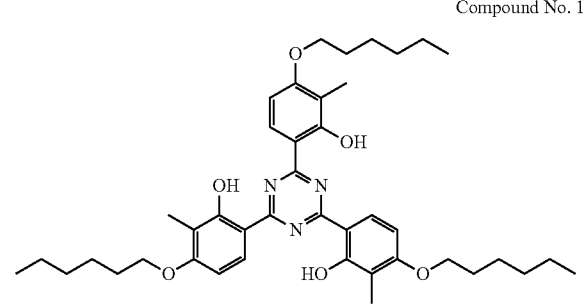

Compound No. 1

-continued

[Chem. 6]

Compound No. 2

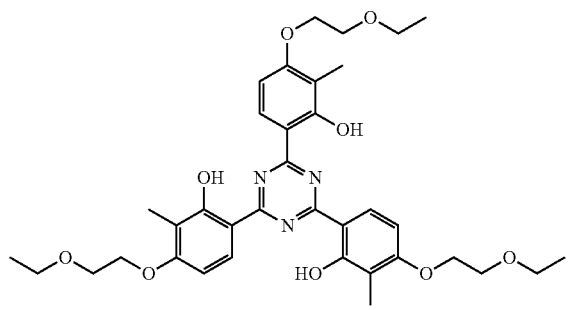

[Chem. 7]

Compound No. 3

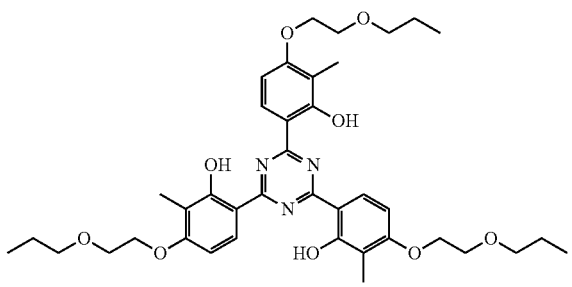

[Chem. 8]

Compound No. 4

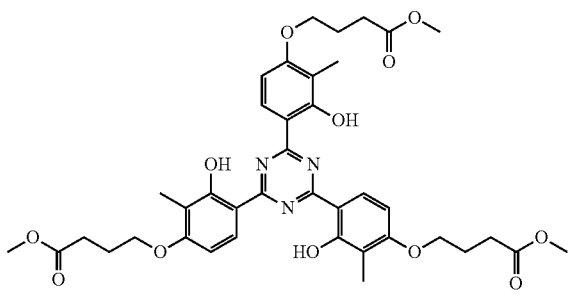

[Chem. 9]

Compound No. 5

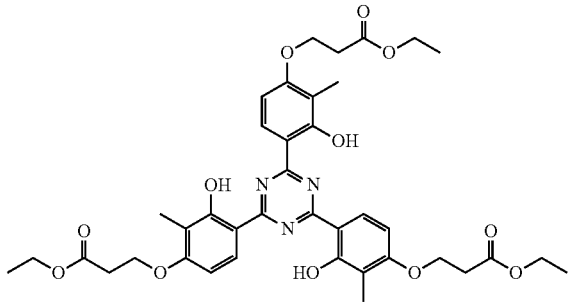

Next, the insect-proofing film of the present invention is described in further detail.

The insect-proofing film of the present invention can be obtained by, for example, mixing and kneading a triazine-based compound represented by formula (1) or (2), which is a UV absorber, as-is or together with a binder resin and/or an additive to a synthetic resin, and then shaping the mixture into a film. Alternatively, the triazine-based compound may be applied, as a coating for example, to a synthetic-resin base material.

Methods for obtaining the insect-proofing film of the present invention are not particularly limited. For example, the following three methods can be employed.

{Method 1} Blend and mix a triazine-based compound represented by formula (1) or (2), which is a UV absorber, to a synthetic resin, to prepare a UV-absorbing resin composition; and heat and shape the composition to create a film.

{Method 2} Prepare a coating material or a coating solution including a triazine-based compound represented by formula (1) or (2), which is a UV absorber; and coat a shaped article, which becomes a film whose base material is made of a synthetic resin, with the coating material/coating solution.

{Method 3} Add a triazine-based compound represented by formula (1) or (2), which is a UV absorber, to an adhesive; apply the adhesive to a film; and create a laminated resin film.

These methods are described in order below.

Method 1:

In Method 1, wherein a triazine-based compound represented by formula (1) or (2) is blended and mixed to a synthetic resin and then the mixture is heated and shaped, the synthetic resin is preferably a resin having the highest-possible transparency when made into a resin film. Concrete examples include, although not limited to: polyethylene; polypropylene; polystyrene; copolymers of polyethylene and a cycloolefin such as norbornene; polyacrylic acid; polyacrylates; vinyl compounds, such as polyvinyl acetate, polyacrylonitrile, polyvinyl chloride, and polyvinyl fluoride, and addition polymers of vinyl compounds; polymethacrylic acid; polymethacrylates; polyvinylidene chloride; polyvinylidene fluoride; polyvinylidene cyanide; copolymers of vinyl compounds or fluorine-based compounds, such as vinylidene fluoride/trifluoroethylene copolymer, vinylidene fluoride/tetrafluoroethylene copolymer, and vinylidene cyanide/vinyl acetate copolymer; compounds including fluorine, such as polytrifluoroethylene, polytetrafluoroethylene, and polyhexafluoropropylene; polyamides, such as nylon 6 and nylon 66; polyimides; polyurethanes; polypeptides; polyesters such as polyethylene terephthalate; polycarbonates; polyoxymethylene; polyethers, such as polyethylene oxide and polypropylene oxide; epoxy resins; polyvinyl alcohols; and polyvinyl butyral.

The concrete preparation steps in Method 1 may slightly differ depending on the base resin used, the processing temperature, the filming conditions, etc.; for example, a triazine-based compound represented by formula (1) or (2) may be added to a powder or pellets of a base resin and heated and mixed/kneaded within a range from 150 to 350° C., and the mixture may be shaped into a film, or made into a film with an extruder, or made into an original sheet with an extruder and then drawn uniaxially or biaxially at a ratio of two to five times within a range from 30 to 120° C., to prepare a film with a thickness from 10 to 200 µm. During mixing/kneading, it is possible to add: additives ordinarily used for shaping/molding resins, such as infrared absorbers, antioxidants, light stabilizers, flame retardants, and plasticizers; dyes and/or pigments for controlling color; and other UV absorbers.

In Method 1, the amount of triazine-based compound represented by the formula (1) or (2) added to synthetic resin is preferably from 0.001 to 20 mass %, more preferably from 0.01 to 10 mass %, even more preferably from 0.1 to 5 mass %. If the amount is less than 0.001 mass %, the insect-proofing effect, such as preventing the attraction of flying insects, may be insufficient. If the amount is greater than 20 mass %, the transparency of the film may deteriorate.

Method 2:

Method 2, wherein a coating material/coating solution is prepared and then coated, involves: a method of dissolving a triazine-based compound represented by formula (1) or (2) in a binder resin and an organic solvent, to prepare a coating material; or a method of dissolving or dispersing a triazine-based compound represented by formula (1) or (2) in a binder resin and an aqueous solvent, to prepare an aqueous coating material.

In the former method, examples of the binder resin include aliphatic ester resins, acrylic resins, melamine resins, urethane resins, aromatic ester resins, polycarbonate resins, aliphatic polyolefin resins, aromatic polyolefin resins, polyvinyl-based resins, polyvinyl alcohol resins, polyvinyl-based modified resins (PVB, EVA, etc.), or copolymer resins of the above. Examples of organic solvents that are usable include halogen-based, alcohol-based, ketone-based, ester-based, aliphatic hydrocarbon-based, aromatic hydrocarbon-based, and ether-based solvents, and mixtures of the above.

The latter method involves: dissolving or dispersing a triazine-based compound represented by formula (1) or (2) in an aqueous binder resin; or micronizing a triazine-based compound represented by formula (1) or (2) into particles that are several micrometers or smaller, and dispersing the particles as an emulsion in an aqueous solvent, employing an emulsifier if necessary.

Examples of the aqueous binder resin include polyvinyl alcohol or modified products thereof, polyacrylic acid or copolymers thereof, and cellulose or modified products thereof.

Examples of the aqueous solvent include water, or a mixture in which an alcohol such as methylalcohol, a ketone such as acetone, or an ether such as tetrahydrofuran is added to water.

An example of an emulsion is an emulsion in which particles (from 50 to 500 nm) of a triazine-based compound represented by formula (1) or (2) are dispersed in an uncolored acrylic emulsion coating material, such as an acrylic emulsion-based aqueous coating material dispersed in an acrylic emulsion.

In Method 2, the amount of triazine-based compound represented by formula (1) or (2) used with respect to the total amount of binder resin and synthetic resin of the base material to be coated is preferably from 0.001 to 20 mass %, more preferably from 0.01 to 10 mass %, even more preferably from 0.1 to 5 mass %. If the amount is less than 0.001 mass %, the insect-proofing effect, such as preventing the attraction of flying insects, may be insufficient. If the amount is greater than 20 mass %, the transparency of the film may deteriorate.

To the coating material or coating solution, it is possible to add: additives ordinarily used for coating materials, such as near-infrared absorbers, antioxidants, and light stabilizers; dyes and/or pigments for controlling color; and other UV absorbers.

A synthetic-resin film or sheet, serving as a base material, is coated with the coating material or coating solution prepared according to the method by a bar coater, a gravure coater, a comma coater, a lip coater, a curtain coater, a roll coater, a blade coater, a spin coater, a reverse coater, or a die coater, or with a spray, etc., to prepare an insect-proofing film. To protect the coating surface, a protective layer may be provided, or a transparent resin plate or a transparent resin film may be bonded to the coating surface. Cast-filming is included in the present method.

Method 3:

In Method 3, wherein a triazine-based compound represented by (1) or (2) is included in an adhesive and a laminated resin film is prepared, it is possible to use, as the adhesive, known transparent adhesives such as adhesives generally used for resins, such as silicon-based, urethane-based, and acrylic-based adhesives, polyvinyl butyral adhesive (PVB), and ethylene-vinyl acetate adhesive. In Method 3, an adhesive to which a triazine-based compound represented by formula (1) or (2) is added is used to bond resin films together to prepare a laminated film. A method involving thermocompression bonding may also be employed.

In Method 3, the amount of triazine-based compound represented by formula (1) or (2) used with respect to the total amount of solid content in the adhesive and synthetic resin of the base material is preferably from 0.001 to 20 mass %, more preferably from 0.01 to 10 mass %, even more preferably from 0.1 to 5 mass %. If the amount is less than 0.001 mass %, the insect-proofing effect, such as preventing the attraction of flying insects, may be insufficient. If the amount is greater than 20 mass %, the transparency of the film may deteriorate.

Next, resins employed for the base material of the insect-proofing film of the present invention are described. Although the resin for the base material is not particularly limited, it is preferably transparent.

Examples of resins include: cellulose esters such as diacetylcellulose, triacetylcellulose (TAC), propionylcellulose, butyrylcellulose, acetylpropionylcellulose, and nitrocellulose; polyamides such as nylon 6 and nylon 66; polyimides; polyurethanes; epoxy resins; polycarbonates; polyesters such as polyethylene terephthalate, polyethylene naphthalate, polybutylene terephthalate, poly-1,4-cyclohexane dimethylene terephthalate, polyethylene-1,2-diphenoxyethane-4,4'-dicarboxylate, and polybutylene terephthalate; polystyrenes; polyolefins such as polyethylene, polypropylene, polymethylpentene, and copolymers of polyethylene and a cycloolefin such as norbornene; vinyl compounds such as polyacrylonitrile, polyvinyl acetate, polyvinyl chloride, and polyvinyl fluoride; polyvinylidene chloride; polyvinylidene fluoride; polyvinylidene cyanide; copolymers of vinyl compounds or fluorine-based compounds, such as vinylidene fluoride/trifluoroethylene copolymer, vinylidene fluoride/tetrafluoroethylene copolymer, and vinylidene cyanide/vinyl acetate copolymer; acrylic resins such as polyacrylic acid, polymethyl methacrylate, and polyacrylates; compounds including fluorine such as polyhexafluoropropylene; polycarbonates; polysulfones; polyethersulfones; polyetherketones; polyetherimides; polyethers such as polyoxymethylene, polyethylene oxide, and polypropylene oxide; polyvinyl alcohols; polyvinyl butyral; and norbornene resins. Among the resins, polyester resins, norbornene resins, and acrylic resins are preferred.

The resin may be used alone, or two or more types of resins may be used as a mixture and/or a copolymer, or be laminated, depending on the use/application.

The insect-proofing film of the present invention may have a single-layer structure, or have a multi-layer structure in which layers are bonded together. In multi-layer structures, the triazine-based compound of the formula (1) or (2) only needs to be used in at least one of the layers.

If necessary, various additives may be used in the synthetic resin(s) used in the insect-proofing film of the present invention, and also, the base material resin may be subjected to a surface treatment.

Examples of additives include antioxidants (phenol-based, phosphorus-based, thioether-based, etc.), UV absorbers other than the triazine compound of the present invention, hindered amine-based light stabilizers, nucleating agents, antistatic agents, light-absorbing coloring agents, pigments, dyes, slip additives, processing aids, plasticizers, metal deactivators, and flame retardants such as inorganic particulates, halogen-based compounds, phosphoric acid ester-based compounds, phosphoric acid amide-based compounds, melamine-based compounds, fluorine resins, silicone resin, metal oxides, (poly)melamine phosphate, and (poly)piperazine phosphate.

Examples of the phenol-based antioxidant include 2,6-di-tert-butyl-p-cresol, 2,6-diphenyl-4-octadesiloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thio-bis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethylene glycol bis[(3,5-di-tert-butyl-4-hydroxyphenyl)propionate], 1,6-hexamethylene-bis[(3,5-di-tert-butyl-4-hydroxyphenyl) propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl)propionyloxyethyl] isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane, triethylene glycol bis[(3-tert-butyl-4-hydroxy-5-methylphenyl)propionate], and tocopherol.

Examples of the phosphorus-based antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidene bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis (4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]eth yl)amine, 2-(1,1-dimethylethyl)-6-methyl-4-[3-[[2,4,8,10-tetrakis(1,1-dimethylethyl)dibenzo [d,f][1,3,2]dioxaphosphepin-6-yl]oxy]propyl]phenol, and a phosphite of 2-ethyl-2-butylpropylene glycol and 2,4,6-tri-tert-butylphenol.

Examples of the thioether-based antioxidant include dialkyl thiodipropionates, such as dilauryl thiodipropionate, dimyristyl thiodipropionate, and distearyl thiodipropionate, and β-alkylmercaptopropionate esters of polyols, such as pentaerythritol tetra (β-dodecylmercaptopropionate).

Examples of UV absorbers other than the triazine compound of the present invention include benzotriazole-based, benzophenone-based, and benzoate-based UV absorbers, and triazine-based UV absorbers other than triazine-based UV absorbers represented by the formula (1) or (2).

Examples of benzotriazole-based UV absorbers include, although not particularly limited to, 2-(2'-hydroxyphenyl) benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2-(2'-hydroxy-3'-tert-butyl-5'-carboxyphenyl)benzotriazole, and 2,2'-methylene-bis(4-tert-octyl-6-(benzotriazolyl)phenol).

Examples of benzophenone-based UV absorbers include, although not particularly limited to, 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone).

Examples of benzoate-based UV absorbers include, although not particularly limited to, phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate.

Examples of triazine-based UV absorbers other than the triazine-based UV absorbers represented by the formula (1) or (2) include triaryltriazines such as 2-(2-hydroxy-4-octoxyphenyl)-4,6-bis(2,4-dimethylphenyl)-s-triazine, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-(2-hydroxy-4-hexyloxyphenyl)-4,6-dibiphenyl-s-triazine, 2,4-bis(2-hydroxy-4-octoxyphenyl)-6-(2,4-dimethylphenyl)-s-triazine, 2,4,6-tris(2-hydroxy-4-octoxyphenyl)-s-triazine, and 2-(4-isooctyloxycarbonylethoxyphenyl)-4,6-diphenyl-s-triazine.

Examples of the hindered-amine-based light stabilizer include hindered-amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl)sebacate, tetrakis(2,2,6,6-tetramethyl-4-piperidylbutane tetracarboxylate, tetrakis(1,2,2,6,6-pentamethyl-4-piperidylbutane tetracarboxylate, bis(2,2,6,6-tetramethyl-4-piperidyl)·di(tridecyl)-1,2,3,4-butane tetracarboxylate, bis(1,2,2,6,6-pentamethyl-4-piperidyl)·di(tridecyl)-1,2,3,4-butane tetracarboxylate, bis(1,2,2,6,6-pentamethyl-4-piperidyl)-2-butyl-2-(3,5-di-tert-butyl-4-hydroxybenzy 1) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromo ethane polycondensate, 1,6-bis(2,2,6,6-tetramethyl-4-piperidylamino)hexane/2,4-dichloro-6-morpholino-s-t riazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]

aminoundecane, and 1,6,11-tris[2,4-bis(N-butyl-N-(1,2,2,6,6-pentamethyl-4-piperidyl)amino)-s-triazin-6-yl]aminoundecane.

Examples of the nucleating agent include: metal salts of benzoic acids such as aluminum p-t-butylbenzoate and sodium benzoate; aromatic phosphoric ester metal salts such as sodium bis(2,4-di-t-butylphenyl)phosphate, sodium methylene-bis(2,4-di-t-butylphenyl)phosphate, and hydroxyaluminum bis[methylene-bis(2,4-di-t-butylphenyl)phosphate]; a mixture of an aromatic phosphoric ester metal salt and an alkali metal compound; dibenzylidene sorbitols such as dibenzylidene sorbitol, bis(methylbenzylidene) sorbitol, and bis(dimethylbenzylidene sorbitol); amino acid metal salts; and rosin acid metal salts.

Examples of the antistatic agent include: cationic antistatic agents such as quaternary ammonium ion salts of fatty acids and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents such as polyol fatty acid esters, polyglycol phosphates, and polyoxyethylene alkylallyl ethers; and amphoteric antistatic agents such as amphoteric alkyl betaines, e.g. alkyl dimethylaminoacetic acid betaine, and imidazoline-type amphoteric surfactants. These antistatic agents may be used individually, or two or more types of antistatic agents may be used in combination.

Examples of the surface treatment include chemical treatment, mechanical treatment, corona discharge treatment, flame treatment, UV irradiation, high-frequency/microwave treatment, glow discharge treatment, active plasma treatment, laser treatment, treatment with mixed acid, and ozone oxidation. The surface treatment may provide the surface with, for example, a multitude of projections and depressions and/or lines.

The method for using the insect-proofing film of the present invention is not particularly limited so long as the purpose is to block UV rays and prevent flying insects from being attracted or flying in. The insect-proofing film may be used, for example, by being directly bonded in the form of a film to light-emitting elements, such as fluorescent lamps, mercury lamps, and LED illumination, or may be used as a cover for covering light-emitting elements. The insect-proofing film may be used by being bonded to window panes, or may be used as agricultural films for cultivating crops or flowering plants.

It is also preferable to use the insect-proofing film by bonding the film to glass, resin-laminated glass, construction materials, transparent boards, synthetic resin plates, synthetic resin films, and synthetic resin sheets.

The thickness of the insect-proofing film of the present invention is not particularly limited so long as it is less than 200 μm, but preferably, the thickness is 10 μm or greater to less than 200 μm.

The insect-proofing film of the present invention preferably blocks UV rays and lets visible rays pass through. Thus, it is preferable that the transmittance of visible rays with a wavelength of 500 nm is preferably from 80 to 100%, more preferably from 90 to 100%. A high transmittance of such visible rays prevents brightness from decreasing and the color of illumination from becoming unnatural when the film is used for illumination; when the film is used on a window pane, natural light can be taken in without impairing transparency; and when the film is used as an agricultural film, no negative effect is inflicted on the growth of crops because natural light can be taken in. Further, the insect-proofing film of the present invention efficiently blocks UV rays in the long-wavelength range from 380 nm to 400 nm, and the transmittance of UV rays with a wavelength of 400 nm is preferably from 0 to 5.0%, more preferably from 0 to 1.0%. It should be noted that the absorptance of UV rays and the transmittance of visible rays can be adjusted by the thickness of the film and/or the thickness of the coating layer.

Next, the insect-proofing cover of the present invention will be described.

The insect-proofing cover of the present invention covers a light-emitting element, such as a fluorescent lamp, a mercury lamp, or an LED illumination, to thereby block UV rays emitted from the light-emitting element.

For the insect-proofing cover of the present invention, it is possible to use a cover obtained according to similar methods as those for the insect-proofing film and having a thickness of 200 μm or greater, and such an insect-proofing cover having a thickness of 200 μm or greater may be used by being bonded to a cover of an illumination fixture, such as a fluorescent lamp cover conventionally known in the art.

Other than the insect-proofing covers, it is possible to use, for example, covers obtained according to the following two methods as the insect-proofing cover of the present invention.

{Method A} Blend and mix a triazine-based compound represented by formula (1) or (2), which is a UV absorber, to a synthetic resin, to prepare a UV-absorbing resin composition; and heat and shape the composition to create a cover.

{Method B} Prepare a coating material or a coating solution including a triazine-based compound represented by formula (1) or (2), which is a UV absorber; and coat a shaped article, whose base material is made of a synthetic resin or glass, with the coating material/coating solution.

These methods are described in order below.

Method A:

In Method A, wherein a triazine-based compound represented by formula (1) or (2) is blended and mixed to a synthetic resin and then the mixture is heated and shaped, the synthetic resin is preferably a resin having the highest-possible transparency when made into a resin film. Concrete examples include, although not limited to: polyethylene; polypropylene; polystyrene; copolymers of polyethylene and a cycloolefin such as norbornene; polyacrylic acid; polyacrylates; vinyl compounds, such as polyvinyl acetate, polyacrylonitrile, polyvinyl chloride, and polyvinyl fluoride, and addition polymers of vinyl compounds; polymethacrylic acid; polymethacrylates; polyvinylidene chloride; polyvinylidene fluoride; polyvinylidene cyanide; copolymers of vinyl compounds or fluorine-based compounds, such as vinylidene fluoride/trifluoroethylene copolymer, vinylidene fluoride/tetrafluoroethylene copolymer, and vinylidene cyanide/vinyl acetate copolymer; compounds including fluorine, such as polytrifluoroethylene, polytetrafluoroethylene, and polyhexafluoropropylene; polyamides, such as nylon 6 and nylon 66; polyimides; polyurethanes; polypeptides; polyesters such as polyethylene terephthalate; polycarbonates; polyoxymethylene; polyethers, such as polyethylene oxide and polypropylene oxide; epoxy resins; polyvinyl alcohols; and polyvinyl butyral.

The methods for preparing the insect-proofing cover of the present invention may slightly differ depending on the base resin used, the processing temperature, the processing conditions, etc.; in general, a triazine-based compound represented by formula (1), particularly formula (2), may be added to a powder or pellets of a base resin and heated and mixed/kneaded within a range from 150 to 350° C., and the mixture may be shaped into a shaped article. The shaping method is not particularly limited, and a shaped article which becomes a cover can be produced by, for example, extrusion, calendering, injection molding, rolling, compression molding, or blow molding. During mixing/kneading, it is possible to add: additives ordinarily used for shaping/molding resins, such as infrared absorbers, antioxidants, light stabilizers, flame retardants, and plasticizers; dyes and/or pigments for controlling color; and other UV absorbers.

In Method A, the amount of triazine-based compound represented by the formula (1), particularly formula (2), added to synthetic resin is preferably from 0.001 to 20 mass %, more preferably from 0.01 to 10 mass %, even more preferably from 0.1 to 5 mass %. If the amount is less than 0.001 mass %, the insect-proofing effect, such as preventing the attraction of flying insects, may be insufficient. If the amount is greater than 20 mass %, transparency may deteriorate.

Method B:

Method B, wherein a coating material/coating solution is prepared and then coated, involves: a method of dissolving a triazine-based compound represented by formula (1) or (2) in a binder resin and an organic solvent, to prepare a coating material; or a method of dissolving or dispersing a triazine-based compound represented by formula (1) or (2) in a binder resin and an aqueous solvent, to prepare an aqueous coating material.

In the former method, examples of the binder resin include aliphatic ester resins, acrylic resins, melamine resins, urethane resins, aromatic ester resins, polycarbonate resins, aliphatic polyolefin resins, aromatic polyolefin resins, polyvinyl-based resins, polyvinyl alcohol resins, polyvinyl-based modified resins (PVB, EVA, etc.), or copolymer resins of the above. Examples of organic solvents that are usable include halogen-based, alcohol-based, ketone-based, ester-based, aliphatic hydrocarbon-based, aromatic hydrocarbon-based, and ether-based solvents, and mixtures of the above.

The latter case involves: dissolving or dispersing a triazine-based compound represented by formula (1) or (2) in an aqueous binder resin; or micronizing a triazine-based compound represented by formula (1) or (2) into particles that are several micrometers or smaller, and dispersing the particles as an emulsion in an aqueous solvent, employing an emulsifier if necessary.

Examples of the aqueous binder resin include polyvinyl alcohol or modified products thereof, polyacrylic acid or copolymers thereof, and cellulose or modified products thereof. Examples of the aqueous solvent include water, or a mixture in which an alcohol such as methylalcohol, a ketone such as acetone, or an ether such as tetrahydrofuran is added to water.

An example of an emulsion is an emulsion in which particles (from 50 to 500 nm) of a triazine-based compound represented by formula (1) or (2) are dispersed in an uncolored acrylic emulsion coating material, such as an acrylic emulsion-based aqueous coating material dispersed in an acrylic emulsion.

In Method B, the amount of triazine-based compound represented by formula (1) or (2) used with respect to the total amount of binder resin and synthetic resin or glass of the base material to be coated is preferably from 0.001 to 20 mass %, more preferably from 0.01 to 10 mass %, even more preferably from 0.1 to 5 mass %. If the amount is less than 0.001 mass %, the insect-proofing effect, such as preventing the attraction of flying insects, may be insufficient. If the amount is greater than 20 mass %, transparency may deteriorate.

To the coating material or coating solution, it is possible to add: additives ordinarily used for coating materials, such as near-infrared absorbers, antioxidants, and light stabilizers; dyes and/or pigments for controlling color; and other UV absorbers. A synthetic-resin shaped article or glass, serving as a base material, is coated with the coating material or coating solution prepared according to the method by a bar coater, a gravure coater, a comma coater, a lip coater, a curtain coater, a roll coater, a blade coater, a spin coater, a reverse coater, or a die coater, or with a spray, etc., to prepare an insect-proofing cover. To protect the coating surface, a protective layer may be provided, or a transparent resin plate or a transparent resin film may be bonded to the coating surface.

Next, resins employed for the base material of the insect-proofing cover of the present invention are described. Although the resin for the base material is not particularly limited, it is preferably transparent.

Examples of resins include: cellulose esters such as diacetylcellulose, triacetylcellulose (TAC), propionylcellulose, butyrylcellulose, acetylpropionylcellulose, and nitrocellulose; polyamides such as nylon 6 and nylon 66; polyimides; polyurethanes; epoxy resins; polycarbonates; polyesters such as polyethylene terephthalate, polyethylene naphthalate, polybutylene terephthalate, poly-1,4-cyclohexane dimethylene terephthalate, polyethylene-1,2-diphenoxyethane-4,4'-dicarboxylate, and polybutylene terephthalate; polystyrenes; polyolefins such as polyethylene, polypropylene, polymethylpentene, and copolymers of polyethylene and a cycloolefin such as norbornene; vinyl compounds such as polyacrylonitrile, polyvinyl acetate, polyvinyl chloride, and polyvinyl fluoride; polyvinylidene chloride; polyvinylidene fluoride; polyvinylidene cyanide; copolymers of vinyl compounds or fluorine-based compounds, such as vinylidene fluoride/trifluoroethylene copolymer, vinylidene fluoride/tetrafluoroethylene copolymer, and vinylidene cyanide/vinyl acetate copolymer; acrylic resins such as polyacrylic acid, polymethyl methacrylate, and polyacrylates; compounds including fluorine such as polyhexafluoropropylene; polycarbonates; polysulfones; polyethersulfones; polyetherketones; polyetherimides; polyethers such as polyoxymethylene, polyethylene oxide, and polypropylene oxide; polyvinyl alcohols; polyvinyl butyral; and norbornene resins.

The resin may be used alone, or two or more types of resins may be used as a mixture and/or a copolymer, or be laminated, depending on the use/application.

If necessary, various additives may be used in the base material resin(s) in the insect-proofing cover of the present invention, and also, the base material resin may be subjected to a surface treatment.

Examples of additives include antioxidants (phenol-based, phosphorus-based, thioether-based, etc.), UV absorbers other than the triazine compound of the present invention, hindered amine-based light stabilizers, nucleating agents, antistatic agents, light-absorbing coloring agents, pigments, dyes, slip additives, processing aids, plasticizers, metal deactivators, and flame retardants such as inorganic particulates, halogen-based compounds, phosphoric acid ester-based compounds, phosphoric acid amide-based compounds, melamine-based compounds, fluorine resins, silicone resin, metal oxides, (poly)melamine phosphate, and (poly)piperazine phosphate.

Examples of the phenol-based antioxidant include 2,6-di-tert-butyl-p-cresol, 2,6-diphenyl-4-octadesiloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thio-bis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethylene glycol bis[(3,5-di-tert-butyl-4-hydroxyphenyl)propionate], 1,6-hexamethylene-bis[(3,5-di-tert-butyl-4-hydroxyphenyl) propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl] isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane, triethylene glycol bis[(3-tert-butyl-4-hydroxy-5-methylphenyl)propionate], and tocopherol.

Examples of the phosphorus-based antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidene bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]eth yl)amine, 2-(1,1-dimethylethyl)-6-methyl-4-[3-[[2,4,8,10-tetrakis(1,1-dimethylethyl)dibenzo[d,f][1,3,2]dioxaphosphepin-6-yl]oxy]propyl]phenol, and a phosphite of 2-ethyl-2-butylpropylene glycol and 2,4,6-tri-tert-butylphenol.

Examples of the thioether-based antioxidant include dialkyl thiodipropionates, such as dilauryl thiodipropionate, dimyristyl thiodipropionate, and distearyl thiodipropionate, and β-alkylmercaptopropionate esters of polyols, such as pentaerythritol tetra (β-dodecylmercaptopropionate).

Examples of UV absorbers other than the triazine compound of the present invention include benzotriazole-based, benzophenone-based, and benzoate-based UV absorbers, and triazine-based UV absorbers other than triazine-based UV absorbers represented by the formula (1) or (2).

Examples of benzotriazole-based UV absorbers include, although not particularly limited to, 2-(2'-hydroxyphenyl) benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2-(2'-hydroxy-3'-tert-butyl-5'-carboxyphenyl)benzotriazole, and 2,2'-methylene-bis(4-tert-octyl-6-(benzotriazolyl)phenol).

Examples of benzophenone-based UV absorbers include, although not particularly limited to, 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone).

Examples of benzoate-based UV absorbers include, although not particularly limited to, phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate.

Examples of triazine-based UV absorbers other than the triazine-based UV absorbers represented by the formula (1) or (2) include triaryltriazines such as 2-(2-hydroxy-4-octoxyphenyl)-4,6-bis(2,4-dimethylphenyl)-s-triazine, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-(2-hydroxy-4-hexyloxyphenyl)-4,6-dibiphenyl-s-triazine, 2,4-bis(2-hydroxy-4-octoxyphenyl)-6-(2,4-dimethylphenyl)-s-triazine, 2,4,6-tris(2-hydroxy-4-octoxyphenyl)-s-triazine, and 2-(4-isooctyloxycarbonylethoxyphenyl)-4,6-diphenyl-s-triazine.

Examples of the hindered-amine-based light stabilizer include hindered-amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, bis(1,2,2,6,6-pentamethyl-4-piperidyl)sebacate, tetrakis(2,2,6,6-tetramethyl-4-piperidylbutane tetracarboxylate, tetrakis(1,2,2,6,6-pentamethyl-4-piperidylbutane tetracarboxylate, bis (2,2,6,6-tetramethyl-4-piperidyl)•di(tridecyl)-1,2,3,4-butane tetracarboxylate, bis(1,2,2,6,6-pentamethyl-4-piperidyl)•di(tridecyl)-1,2,3,4-butane tetracarboxylate, bis(1,2,2,6,6-pentamethyl-4-piperidyl)-2-butyl-2-(3,5-di-tert-butyl-4-hydroxybenzy l) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl] aminoundecane, and 1,6,11-tris[2,4-bis(N-butyl-N-(1,2,2,6,6-pentamethyl-4-piperidyl)amino)-s-triazin-6-yl] aminoundecane.

Examples of the nucleating agent include: metal salts of benzoic acids such as aluminum p-t-butylbenzoate and sodium benzoate; aromatic phosphoric ester metal salts such as sodium bis(2,4-di-t-butylphenyl)phosphate, sodium methylene-bis(2,4-di-t-butylphenyl)phosphate, and hydroxyaluminum bis[methylene-bis(2,4-di-t-butylphenyl) phosphate]; a mixture of an aromatic phosphoric ester metal salt and an alkali metal compound; dibenzylidene sorbitols such as dibenzylidene sorbitol, bis(methylbenzylidene) sorbitol, and bis(dimethylbenzylidene sorbitol); amino acid metal salts; and rosin acid metal salts.

Examples of the antistatic agent include: cationic antistatic agents such as quaternary ammonium ion salts of fatty acids and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents such as polyol fatty acid esters, polyglycol phosphates, and polyoxyethylene alkylallyl ethers; and amphoteric antistatic agents such as amphoteric alkyl betaines, e.g. alkyl dimethylaminoacetic acid betaine, and imidazoline-type amphoteric surfactants. These antistatic agents may be used individually, or two or more types of antistatic agents may be used in combination.

Examples of the surface treatment include chemical treatment, mechanical treatment, corona discharge treatment, flame treatment, UV irradiation, high-frequency/microwave treatment, glow discharge treatment, active plasma treatment, laser treatment, treatment with mixed acid, and ozone oxidation. The surface treatment may provide the surface with, for example, a multitude of projections and depressions and/or lines.

The thickness of the insect-proofing cover of the present invention is not particularly limited so long as it is 200 μm or greater, but preferably, the thickness is from 200 to 500 μm.

The insect-proofing cover of the present invention is used for covering light-emitting elements with the aim of blocking UV rays and preventing flying insects from being attracted or flying in. The insect-proofing cover is used, for example, as a cover for illumination or light-emitting elements, such as fluorescent lamps, mercury lamps, and LED illumination.

The insect-proofing film and insect-proofing cover of the present invention efficiently absorb and block UV rays, particularly UV rays in the long-wavelength range from 340 nm to 400 nm. By employing the film/cover for light-emitting elements, illumination, window panes, agricultural films, etc., it is possible to prevent flying insects from being attracted to and flying toward light-emitting elements, illuminations, indoor space, and crops.

Further, the present film/cover does not absorb visible rays, particularly rays in the range from 450 nm to 500 nm, and has excellent transparency, thus preventing the lighting from getting dim and the color of the lighting from becoming unnatural. Also, there is no problem in the intake of natural light.

Flying insects on which the insect-proofing film and the insect-proofing cover of the present invention have effect are flying insects having positive phototaxis to UV rays, with examples including: Cicadellidae, such as *Cicadella viridis, Nephotettix cincticeps, Bothrogonia ferruginea, Hishimonus sellatus, Orientus ishidae, Recilia oryzae, Recilia (Inazuma) dorsalis, Tartessus ferrugineus*, and Typhlocybinae; Delphacidae, such as *Sogatella furcifera, Nilaparvata lugens*, and *Laodelphax striatellus*; Psychodidae, such as *Clogmia albipunctatus* and *Tinearia alternate*; Chironomidae, such as *Chironomus plumosos, Tokunagayusurika akamusi*, and *Chironomus yoshimatsui*; and moths, such as *Lymantria dispar japonica, Mamestra brassicae*, Sphingidae, Psychidae, *Plutella xylostella, Sitotroga cerealella, Monema flavescens*, Saturniidae, and *Lymantria dispar japonica*.

In addition to the foregoing embodiments, the present invention also relates to other embodiments of insect-proofing films and insect-proofing covers, methods for producing insect-proofing films and insect-proofing covers, and methods for preventing flying insects from being attracted or flying in by using the insect-proofing films and insect-proofing covers, as described below.

1. A method for producing an insect-proofing film or insect-proofing cover, wherein from 0.001 to 20 mass % (preferably from 0.01 to 10 mass %, more preferably from 0.1 to 5 mass %) of a triazine-based compound represented by formula (1) is added to a synthetic resin and mixed/kneaded therewith to prepare a UV-absorbing resin composition, and the UV-absorbing resin composition is heated and shaped into a film.

2. The method for producing an insect-proofing film or insect-proofing cover as set forth in clause 1, wherein a polyester, an acrylic resin, or a polycarbonate is used as the synthetic resin.

3. A method for producing an insect-proofing film or insect-proofing cover, wherein a coating material or coating solution including a triazine-based compound represented by formula (1) is prepared, and a shaped article, which becomes a film whose base material is made of a synthetic resin, is coated with the coating material or coating solution.

4. The method for producing an insect-proofing film or insect-proofing cover as set forth in clause 3, wherein the triazine-based compound represented by formula (1) is dissolved in a binder resin and an organic solvent and is made into a coating material.

5. The method for producing an insect-proofing film or insect-proofing cover as set forth in clause 4, wherein an acrylic resin or a polyester is used as the binder resin.

6. The method for producing an insect-proofing film or insect-proofing cover as set forth in clause 3, wherein the triazine-based compound represented by formula (1) is dissolved or dispersed in a binder resin and an aqueous solvent and is made into an aqueous coating material.

7. The method for producing an insect-proofing film or insect-proofing cover as set forth in clause 6, wherein the triazine-based compound represented by formula (1) is dissolved or dispersed in an aqueous binder resin.

8. The method for producing an insect-proofing film or insect-proofing cover as set forth in clause 6, wherein the triazine-based compound represented by formula (1) is micronized into particles having a particle diameter ranging from 50 to 500 nm, and the particles are dispersed as an emulsion in an aqueous solvent, employing an emulsifier if necessary.

9. The method for producing an insect-proofing film or insect-proofing cover as set forth in clause 7, wherein an aqueous acrylic resin, an aqueous epoxy resin, or an aqueous urethane resin is used as the aqueous binder resin.

10. The method for producing an insect-proofing film or insect-proofing cover as set forth in any one of clauses 3 to 9, wherein the amount of triazine-based compound represented by formula (1) used with respect to the total amount of binder resin and synthetic resin of the base material to be coated is from 0.001 to 20 mass % (preferably from 0.01 to 10 mass %, more preferably from 0.1 to 5 mass %).

11. A method for producing an insect-proofing film or insect-proofing cover, wherein a triazine-based compound represented by formula (1) is included in an adhesive, and the adhesive is applied to a film, to prepare a laminated resin film.

12. The method for producing an insect-proofing film or insect-proofing cover as set forth in clause 11, wherein an acrylic adhesive, a styrene butadiene rubber-based adhesive, or an ethylene-vinyl acetate-based adhesive is used as the adhesive.

13. The method for producing an insect-proofing film or insect-proofing cover as set forth in clause 11 or 12, wherein the amount of triazine-based compound represented by formula (1) used with respect to the total amount of solid content in the adhesive and synthetic resin of the base material constituting the film is from 0.001 to 20 mass % (preferably from 0.01 to 10 mass %, more preferably from 0.1 to 5 mass %).

14. The method for producing an insect-proofing film or insect-proofing cover as set forth in any one of clauses 3 to 13, wherein a polyester, an acrylic resin, or a polycarbonate is used as the resin of the base material.

15. A method for producing an insect-proofing cover, wherein from 0.001 to 20 mass % (preferably from 0.01 to 10 mass %, more preferably from 0.1 to 5 mass %) of a triazine-based compound represented by formula (1) is blended to a synthetic resin and is mixed/kneaded therewith and is made into a UV-absorbing resin composition, and the UV-absorbing resin composition is heated and shaped into a cover.

16. The method for producing an insect-proofing cover as set forth in clause 15, wherein a polyester, an acrylic resin, or a polycarbonate is used as the synthetic resin.

17. A method for producing an insect-proofing cover, wherein a coating material or coating solution including a triazine-based compound represented by formula (1) is prepared, and a shaped article whose base material is made of a synthetic resin or glass is coated with the coating material/coating solution.

18. The method for producing an insect-proofing cover as set forth in clause 17, wherein the triazine-based compound represented by formula (1) is dissolved in a binder resin and an organic solvent and is made into a coating material.

19. The method for producing an insect-proofing cover as set forth in clause 18, wherein an acrylic resin or a polyester is used as the binder resin.

20. The method for producing an insect-proofing cover as set forth in clause 17, wherein the triazine-based compound represented by formula (1) is dissolved or dispersed in a binder resin and an aqueous solvent and is made into an aqueous coating material.

21. The method for producing an insect-proofing cover as set forth in clause 20, wherein the triazine-based compound represented by formula (1) is dissolved or dispersed in an aqueous binder resin.

22. The method for producing an insect-proofing cover as set forth in clause 20, wherein the triazine-based compound represented by formula (1) is micronized into particles having a particle diameter ranging from 50 to 500 nm, and the particles are dispersed as an emulsion in an aqueous solvent, employing an emulsifier if necessary.

23. The method for producing an insect-proofing cover as set forth in clause 21, wherein an aqueous acrylic resin, an aqueous epoxy resin, or an aqueous urethane resin is used as the aqueous binder resin.

24. The method for producing an insect-proofing cover as set forth in any one of clauses 17 to 23, wherein the amount of triazine-based compound represented by formula (1) used with respect to the total amount of binder resin and synthetic resin or glass of the base material to be coated is from 0.001 to 20 mass % (preferably from 0.01 to 10 mass %, more preferably from 0.1 to 5 mass %).

25. An insect-proofing film or an insect-proofing cover produced according to the method for producing an insect-proofing film or an insect-proofing cover as set forth in any one of clauses 1 to 14.

26. An insect-proofing cover produced according to the method for producing an insect-proofing cover as set forth in any one of clauses 15 to 24.

27. A method for preventing flying insects from being attracted or flying in, the method involving using an insect-proofing film or an insect-proofing cover including at least one type of triazine-based compound represented by formula (1) as a UV absorber.

28. The method for preventing flying insects from being attracted or flying in as set forth in clause 27, wherein from 0.001 to 20 mass % (preferably from 0.01 to 10 mass %, more preferably from 0.1 to 5 mass %) of triazine-based compound represented by formula (1) is used with respect to a synthetic resin.

29. The method for preventing flying insects from being attracted or flying in as set forth in clause 27 or 28, wherein the synthetic resin is a polyester, an acrylic resin, or a polycarbonate.

30. The method for preventing flying insects from being attracted or flying in as set forth in any one of clauses 27 to 29, wherein a triazine-based compound represented by the formula (2) is used as the triazine-based compound represented by the formula (1).

31. The method for preventing flying insects from being attracted or flying in as set forth in any one of clauses 27 to 29, wherein the transmittance of visible rays at a wavelength of 500 nm is from 80% to 100%, and the transmittance of UV rays at a wavelength of 400 nm is from 0% to 5.0%.

EXAMPLES

The present invention is described in detail below according to an Example and Comparative Examples. The present invention, however, is not limited to the following Example.

Example 1

To 100 parts by mass of polyethylene terephthalate (intrinsic viscosity: 0.8 dL/g), 3 parts by mass of Compound No. 1 was mixed as a UV absorber. The mixture was molten at a temperature from 260 to 280° C. and extruded by T-die extrusion, to prepare an insect-proofing film having a thickness of 70 μm. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured as follows.

A 1.8-m wide, 1.8-m long, 1.8-m high wooden box was prepared. A 40 W white fluorescent lamp was provided at the center on the top inside surface of the box. An 80×80 cm opening was provided at the center in the front surface of the box. The entirety of the 40 W white fluorescent lamp was covered by the obtained insect-proofing film.

The box was placed outdoors, and the white fluorescent lamp was lit up for 30 minutes from 7:00 p.m. to 7:30 p.m. (except in case of rain) in August. Thereafter, an insecticide was sprayed inside the box, and the opening was closed. After the insects died out, the number of insects inside the box was counted. The measurement was performed on five different days. The average value is shown in Table 1.

[Chem. 10]

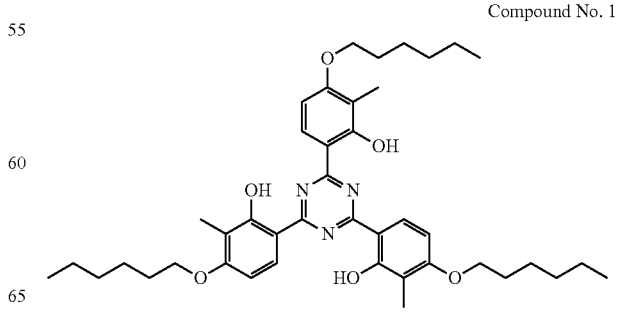

Compound No. 1

Comparative Example 1

An insect-proofing film was prepared in the same way as in Example 1, except that no UV absorber was used. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured in the same way as in Example 1. The result is shown in Table 1.

Comparative Example 2

An insect-proofing film was prepared in the same way as in Example 1, except that the following Compound No. 6, which is a monohydroxyphenyl triazine compound having a similar structure to the present triazine-based compound, was used as a UV absorber instead of Compound No. 1. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured in the same way as in Example 1. The result is shown in Table 1.

[Chem. 11]

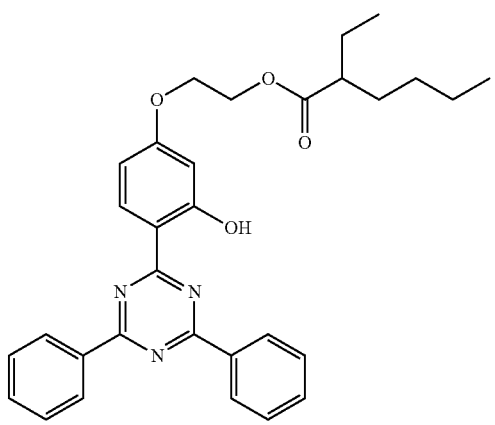

Compound No. 6

Comparative Example 3

An insect-proofing film was prepared in the same way as in Example 1, except that the following Compound No. 7, which is a benzotriazole-based UV absorber, was used as a UV absorber instead of Compound No. 1. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured in the same way as in Example 1. The result is shown in Table 1.

[Chem. 12]

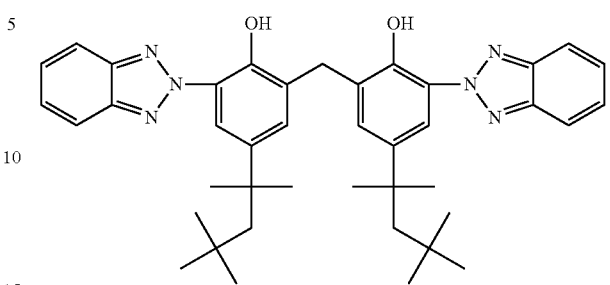

Compound No. 7

Comparative Example 4

An insect-proofing film was prepared in the same way as in Example 1, except that the following Compound No. 8, which is a benzotriazole-based UV absorber, was used as a UV absorber instead of Compound No. 1. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured in the same way as in Example 1. The result is shown in Table 1.

[Chem. 13]

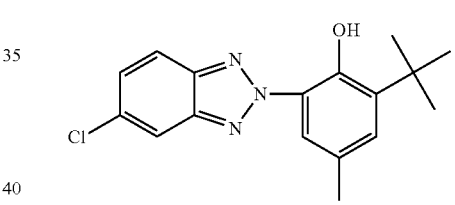

Compound No. 8

Comparative Example 5

An insect-proofing film was prepared in the same way as in Example 1, except that the following Compound No. 9, which is a benzophenone-based UV absorber, was used as a UV absorber instead of Compound No. 1. The transmittance of visible rays at a wavelength of 500 nm and the transmittance of UV rays at a wavelength of 400 nm were measured for the obtained insect-proofing film. The results are shown in Table 1.

Further, the insect-proofing effect of the obtained insect-proofing film was measured in the same way as in Example 1. The result is shown in Table 1.

[Chem. 14]

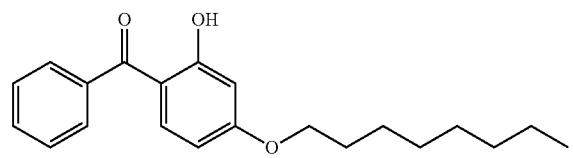

Compound No. 9

TABLE 1

|  | Example 1 | Comparative Example 1 | Comparative Example 2 | Comparative Example 3 | Comparative Example 4 | Comparative Example 5 |
|---|---|---|---|---|---|---|
| Transmittance at wavelength 500 nm (%) | 94.1 | 96.8 | 93.8 | 93.4 | 94.3 | 93.5 |
| Transmittance at wavelength 400 nm (%) | 0.5 | 94.8 | 76.0 | 58.1 | 7.8 | 88.7 |
| Number of flying insects | 5 | 126 | 107 | 89 | 32 | 122 |

The results of Table 1 show that the insect-proofing film of the present invention wards off flying insects and has excellent insect-proofing effects while maintaining transmissibility of visible rays.

The invention claimed is:

1. An insect-proofing film or insect-proofing cover comprising, as a UV absorber, at least one type of triazine-based compound represented by the formula (1):

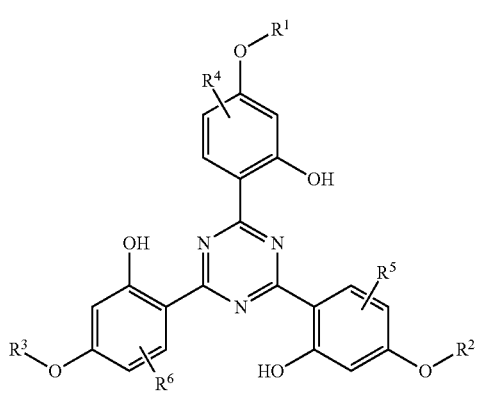

wherein $R^1$ to $R^3$ may be the same or different from one another and each represent a $C_{1-12}$ linear or branched alkyl group, a $C_{3-8}$ cycloalkyl group, a $C_{2-8}$ alkenyl group, a $C_{6-18}$ aryl group, a $C_{7-18}$ alkylaryl group, or a $C_{7-18}$ arylalkyl group, wherein the alkyl group, the cycloalkyl group, the alkenyl group, the aryl group, the alkylaryl group, or the arylalkyl group may be optionally substituted by a hydroxy group, a halogen atom, or a $C_{1-12}$ alkyl group or alkoxy group, or may be optionally interrupted by an oxygen atom, a sulfur atom, a carbonyl group, an ester group, an amide group, or an imino group, and the substitution and the interruption may be employed in combination; and $R^4$ to $R^6$ may be the same or different from one another and each represent a $C_{1-8}$ alkyl group or a $C_{2-8}$ alkenyl group;

wherein the transmittance of visible rays at a wavelength of 500 nm is from 80% to 100%, and the transmittance of UV rays at a wavelength of 400 nm is from 0% to 5.0%.

2. The insect-proofing film or insect-proofing cover according to claim 1, wherein the triazine-based compound represented by the formula (1) is a triazine-based compound represented by the formula (2):

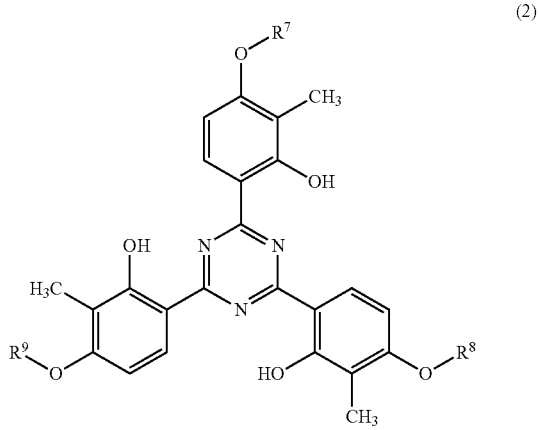

wherein $R^7$ to $R^9$ may be the same or different from one another and each represent a $C_{1-12}$ linear or branched alkyl group, wherein the alkyl group may be optionally substituted by a hydroxy group, a halogen atom, or a $C_{1-12}$ alkoxy group, or may be optionally interrupted by an oxygen atom, a sulfur atom, a carbonyl group, an ester group, an amide group, or an imino group.

* * * * *